United States Patent
Poortmann et al.

(10) Patent No.: US 7,296,483 B2
(45) Date of Patent: Nov. 20, 2007

(54) MAGNETOINDUCTIVE FLOWMETER WITH DETACHABLE COMPONENTS

(75) Inventors: Boudewijn Jozef Poortmann, Dordrecht (NL); Pieter Herremans, Giessenburg (NL); Robin Michael Lee, Cambridge (GB); Ross Peter Jones, Cambridge (GB)

(73) Assignee: Krohne AG, Basel (CH)

( * ) Notice: Subject to any disclaimer, the term of this patent is extended or adjusted under 35 U.S.C. 154(b) by 18 days.

(21) Appl. No.: 11/299,867

(22) Filed: Dec. 9, 2005

(65) Prior Publication Data

US 2007/0137311 A1 Jun. 21, 2007

(51) Int. Cl.
*G01F 1/56* (2006.01)
(52) U.S. Cl. .................................... 73/861.08
(58) Field of Classification Search ...... None
See application file for complete search history.

(56) References Cited

U.S. PATENT DOCUMENTS 3,446,071 A 5/1969 Kolin et al.
4,635,486 A 1/1987 Jacobsen et al.
4,641,537 A 2/1987 Hansen et al.
4,774,844 A 10/1988 Davis
5,113,690 A 5/1992 van Nistelrooij et al.
5,540,103 A 7/1996 Zingg
6,453,756 B2 9/2002 van Willigen

FOREIGN PATENT DOCUMENTS

DE 10252041 5/2004
WO WO 2004072590 A1 8/2004

OTHER PUBLICATIONS

European Search Report, European Patent Office, May 8, 2006.

*Primary Examiner*—Harshad Patel
(74) *Attorney, Agent, or Firm*—Cesari & McKenna, LLP

(57) ABSTRACT

A magnetoinductive flowmeter incorporates an electromagnetic circuit with at least one coil and a minimum of two detachably interconnected components of a magnetic material. One of the components features a resiliently deformable spring section that presses against the other component. The result is an easy-to-assemble magnetoinductive flowmeter that can be manufactured with substantial production tolerances.

6 Claims, 2 Drawing Sheets

MAGNETOINDUCTIVE FLOWMETER WITH DETACHABLE COMPONENTS

BACKGROUND OF THE INVENTION

1. Field of the Invention

This invention relates to a magnetoinductive flowmeter incorporating an electromagnetic circuit with at least one coil and a minimum of two detachably interconnected components of a magnetic material. This type of magnetoinductive flowmeter has been described earlier, for instance in DE 34 20 963 C2.

2. Background Information

The general technical concept of a magnetoinductive flowmeter has been well documented in prior art, for example in K. W. Bonfig, "Technische Durchflussmessung" (techno-industrial flow measurement), $3^{rd}$ edition, Vulkan-Verlag, Essen, 2002, pp. 123-167. The fundamental concept of a magnetoinductive flowmeter goes all the way back to Faraday who in 1832 proposed employing the principle of electrodynamic induction for flow-rate measurements. According to Faraday's law of induction, a flowing medium that contains charge carriers and travels through a magnetic field will generate an electric field intensity in a direction perpendicular to the direction of flow and to the magnetic field. A magnetoinductive flowmeter utilizes Faraday's law of induction in that a magnetic field device typically comprising two coils generates a magnetic field and directs it through the cross-sectional lumen of the measuring duct, said magnetic field including a magnetic-field component that extends in a direction perpendicular to the direction of flow. Within this magnetic field, each volume element of the medium flowing through the magnetic field and containing a certain number of charge carriers contributes the field intensity generated in the volume element, to a measuring voltage that can be collected via the electrodes. A salient feature of magnetoinductive flowmeters is the proportionality between the measured voltage and the flow velocity of the medium, averaged across the diameter of the measuring duct, i.e. between the measured voltage and the volume of flux.

Magnetoinductive flowmeters are often of a modular design, consisting of multiple components such as coils, inductor cores, pole shoes, feedback plates etc. In many cases, these components must be produced to stringent precision specifications to ensure a precise fit and correct mutual alignment of the components when the magnetoinductive flowmeter is assembled. One requirement, among others, is the generation of a predefined magnetic field with highly specific properties.

SUMMARY OF THE INVENTION

In light of that situation, it is the objective of this invention to introduce a magnetoinductive flowmeter that combines ease of assembly with low cost of manufacture.

For a magnetoinductive flowmeter as described above, this objective is achieved by providing one of the two detachably interconnected components with an elastically resilient spring segment that presses against the companion component.

Thus, according to the invention, at least one of the components is deformed when brought into its intended position during the assembly of the magnetoinductive flowmeter, i.e. when pressed against the other component. While this generates a retentive force that allows the two components to be held in their respective positions, it also permits the deformability of the resilient section of one component to render it adaptable to the other component without the need for meeting stringent production tolerances.

In essence, the components only need to be in partial physical contact, for instance at certain points or along one or several lines. In a preferred embodiment of the invention, however, the components meet in flush planar fashion so that there is at least one two-dimensional, perhaps even curved, direct-contact surface constituting the interface between the two components.

Basically, this design concept according to the invention can be applied to a variety of components in a magnetoinductive flowmeter, including in particular components of the electromagnetic circuit. In a preferred embodiment of the invention, however, one of the two components consists of a feedback plate that is part of the magnet circuit.

The term feedback plate in this case refers to a component that serves to return the magnetic flow permeating the measuring duct in the opposite direction, usually along a path outside the measuring duct. A feedback plate of that type could be a separate component. However, in a preferred embodiment of the invention, it is the housing of the magnetoinductive flowmeter that functions as the feedback plate. In fact, the housing of the magnetoinductive flowmeter can simultaneously perform the function of two, typically opposing, feedback plates.

As an added provision, the other component may be in physical contact with the inner housing wall of the magnetoinductive flowmeter, which inner wall is preferably coated with a dielectric layer. As a matter of preference, the housing is in the form of a cylindrical tube.

According to a preferred embodiment of the invention, the other component can be provided with a flexible metal plate. Specifically, in a preferred embodiment of the invention, the coil of the magnetic circuit features an inductor core to which core the flexible metal plate is attached. Thus, using a tubular housing for the magnetoinductive flowmeter that functions as the first component, with the flexible metal plate attached to the core of the coil constituting the companion component, it is a simple matter from both a design and a manipulation perspective to install the magnetic field device in the housing. As stated above, the housing can perform the function of separate feedback plates that would otherwise be necessary.

As an added feature in another preferred embodiment of the invention, the magnet system comprises a pole shoe, which pole shoe is attached to the inductor core opposite the flexible metal plate. In this connection, a preferred embodiment of the invention provides for the core to be of a laminar composition and, preferably, for the flexible metal plate and/or the pole shoe to be constituted of a layer of the laminar core. One particular advantage of such laminar structure is that it reduces eddy currents. It is a known fact that eddy currents cause power dissipation through heat generation proportional to the square of the thickness of the sheet metal, so it follows that a laminar stacking of mutually insulated metal plates substantially reduces the resulting heat-induced energy loss.

While in the process of its installation in the magnetoinductive flowmeter, the flexible metal plate, attached to one side of the core, presses against the inner wall of the preferably tubular housing of the magnetoinductive flowmeter, a preferred embodiment of the invention also provides for the pole shoe attached to the opposite side of the core to be in contact with the measuring duct. The measuring duct itself may have one of a variety of cross-sectional shapes. A preferred embodiment of the invention, however, employs a measuring duct with a flat top and bottom, with the pole shoes preferably contacting the top and, respectively, the bottom surfaces of the measuring duct. In corresponding fashion, two coils are positioned on mutually opposite sides, i.e. above and below, the measuring duct, and are secured in their respective positions by a flexible metal plate that bears on the respective segment of the inner housing wall of the magnetoinductive flowmeter.

To avoid interfering noise and stray fields and to prevent electromagnetic coupling into the coil, a preferred embodiment of the invention includes a coil enclosure which preferably surrounds the coil in its entirety. The inside of the enclosure may even serve as the base for winding the individual turns of the coil.

The coil may in essence be of any desired shape. In a preferred embodiment of the invention, however, the coil is cylindrical or saddle-shaped. In addition, it is possible to mold the coil, perhaps together with the inductor core, into an electrically insulating material.

There are numerous ways in which the magnetoinductive flowmeter according to this invention can be configured and conceptually enhanced. In this context, attention is invited to the dependent claims as well as to the following description of a preferred embodiment of the invention with reference to the attached drawings.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
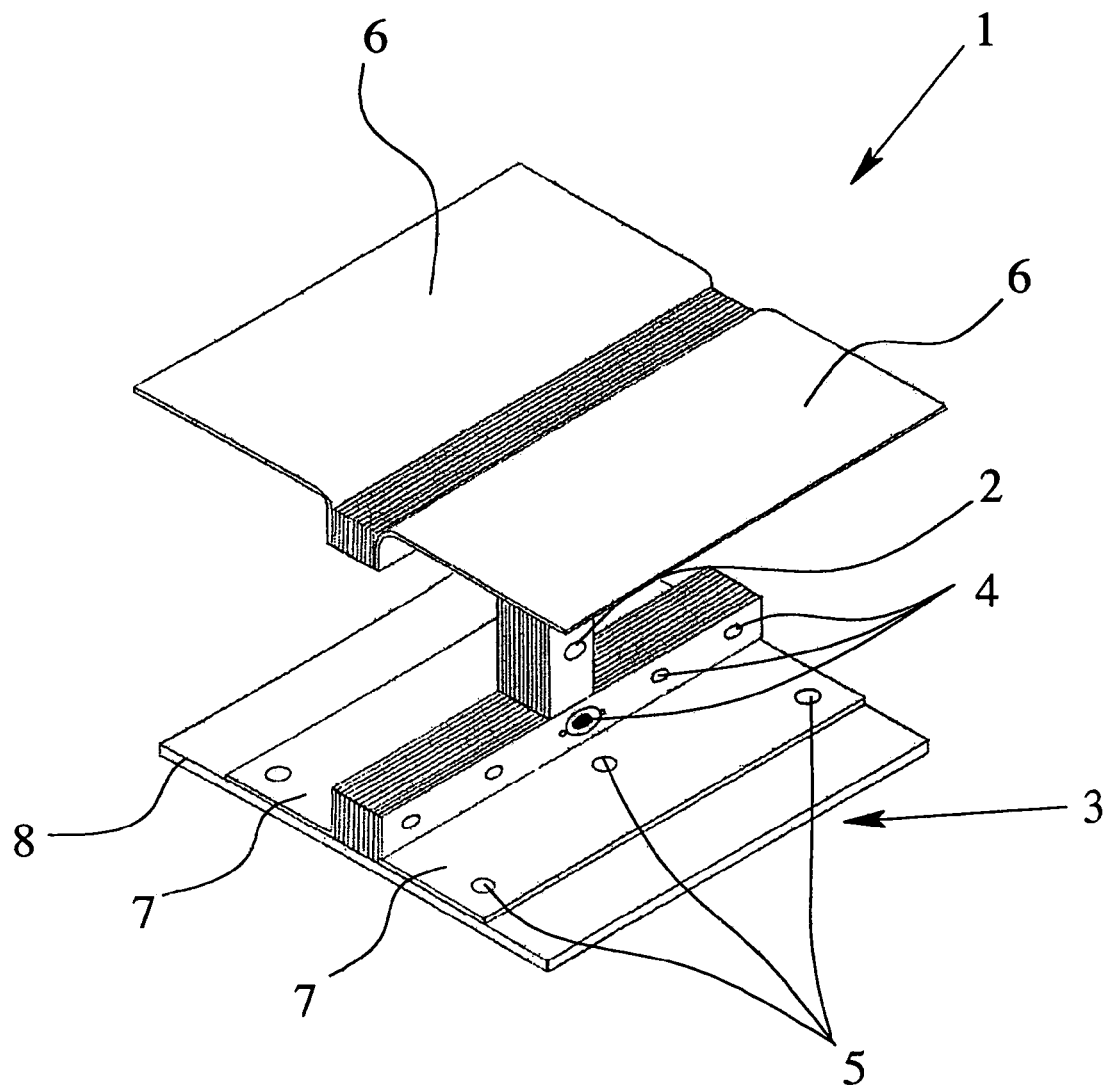
FIG. 1 is illustrates the magnetic circuit module of a magnetoinductive flowmeter according to a preferred embodiment of the invention, consisting of a core, a pole shoe and a flexible metal plate.

In the FIG. 1 module a flexible metal plate 1 is attached to one side of a core 2 for an electromagnet while a pole shoe 3 is attached to the other side of the core 2. This device, consisting of the flexible metal plate 1, the core 2 and the pole shoe 3, is in its entirety composed of multiple, mutually insulated laminar plates. As mentioned above, such laminar structure offers the advantage of reducing eddy currents.

In this preferred embodiment of the invention, the metal plates for the magnetic field module or device of the magnetoinductive flowmeter are held together by multiple bolts 4 and pins 5. The overall configuration is that of a double T, in which the flexible metal plate 1 is composed of two plate sections 6 each of which is bent at one end at a 90° angle and attached to the core 2. The pole shoe 3 is of a corresponding design, in which case thinner plate sections 7 are attached to the core 2 and mounted on a thicker metal plate 8.

Figure 2:
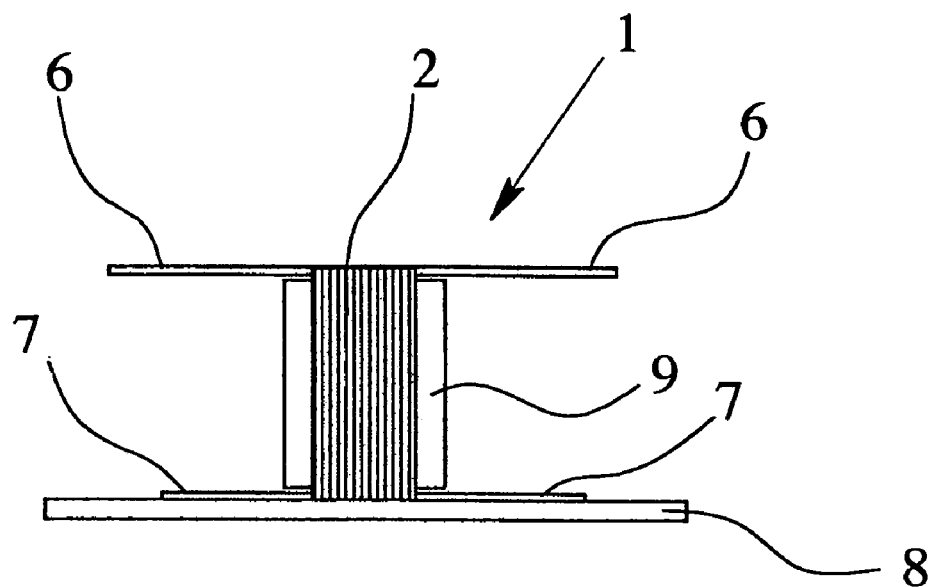
FIG. 2 is depicts the module according to FIG. 1, provided with a coil.
Figure 3:
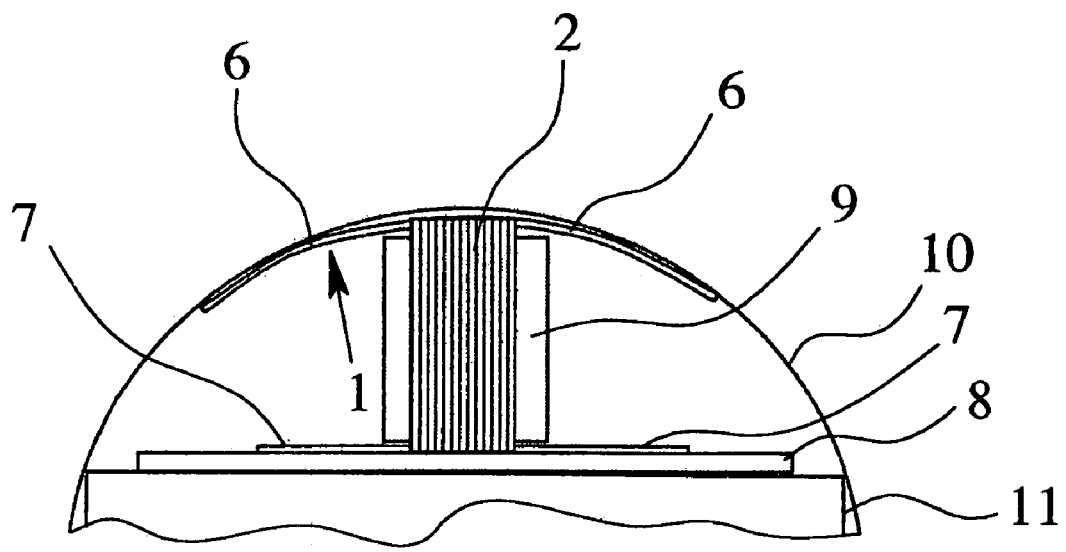
FIG. 3 is shows the installation of this module in the housing of a magnetoinductive flowmeter according to the preferred embodiment of the invention.

The cross-sectional view in FIG. 2 shows the core 2 surrounded by a coil 9. This coil 9 does not have to be wound directly onto the core 2. Instead, the coil 9 may be positioned at a distance from the core 2, for instance in order to reduce stray components in the magnetic flux. The module composed of the flexible metal plate 1, the core 2 with the coil 9 surrounding it and the pole shoe 3 is installed, as shown in FIG. 3, in a tube 10 constituting the housing of the magnetoinductive flowmeter according to the preferred embodiment of the invention here described. The flexible metal plate 1 is pressed against the inner wall of the tube 10 which latter is made of steel and is coated on the inside with a layer of a dielectric material. With its pole shoe 3, the complete device is set on a measuring duct 11 which in this case has a flat top and bottom surface. The bottom of the measuring duct 11 features a corresponding configuration as described above, not illustrated in FIG. 3.

In the resulting overall configuration, all components of the electromagnetic circuit permit simple placement and attachment in the housing of the magnetoinductive flowmeter without it having to be produced to highly precise dimensional specifications, while at the same time there is no need for separate feedback plates since the side walls of the tubular housing 10 also perform the function of the feedback plates. Moreover, it is possible with this design to always use the same coil size for variously dimensioned equipment implementations, with only the remaining components having to be adapted in size, the result being a simple modular design. It is even possible to leave the size, and in particular the length, of the core 2 unchanged since differences in the diameter of the tube 10 constituting the housing and in the cross-sectional profile of the measuring duct 11 are compensated for by a more or less strong bending curvature of the flexible metal plate 1 with a correspondingly larger or smaller area of contact on the inner wall of the tube 10.

The invention claimed is:

1. A magnetoinductive flowmeter with a housing having an inner wall, and a device for an electromagnetic circuit, which comprises a coil provided with a core for an electromagnet, and a pole shoe, wherein the pole shoe is attached to one side of the core, and wherein to the opposite side of the core is attached a flexible metal plate leading to a double-T structure, said flexible metal plate being in flexed conformance with the inner wall of the housing whereby the device is in compressive-stress contact with the inner wall of the housing via the flexible metal plate so that the housing functions as a feedback plate.

2. The magnetoinductive flowmeter as in claim 1, wherein the inner housing wall is provided with a dielectric layer.

3. The magnetoinductive flowmeter as in claim 1 or 2, including a measuring duct with flat top and bottom surfaces inside the housing, said pole shoe being in contact with one of said top and bottom surfaces.

4. A magnetoinductive flowmeter with a housing in the form of a cylindrical tube having an inner wall, and a device for an electromagnetic circuit, which comprises a coil provided with a core for an electromagnet, and a pole shoe, wherein the pole shoe is attached to one side of the core, and wherein to the opposite side of the core is attached a flexible metal plate leading to a double-T structure, said flexible metal plate being in flexed conformance with the inner wall of the housing whereby the device is in compressive-stress contact via inner wall of the housing with the flexible metal plate so that the housing functions as a feedback plate.

5. The magnetoinductive flowmeter as in claim 4, wherein the inner housing wall is provided with a dielectric layer.

6. The magnetoinductive flowmeter as in claim 4 or 5, including a measuring duct with flat top and bottom surfaces inside the housing, said pole shoe being in contact with one of said top and bottom surfaces.

* * * * *